United States Patent [19]
Bishop

[11] 4,154,145
[45] May 15, 1979

[54] BORE SLOTTING MACHINE

[76] Inventor: Arthur E. Bishop, 17 Burton St., Mosman, New South Wales 2088, Australia

[21] Appl. No.: 882,743

[22] Filed: Mar. 2, 1978

Related U.S. Application Data

[63] Continuation of Ser. No. 752,801, Dec. 20, 1976, abandoned.

[30] Foreign Application Priority Data

Dec. 30, 1975 [AU] Australia ............................ PC4411

[51] Int. Cl.² ............................................ B23D 5/00
[52] U.S. Cl. .................................. 409/307; 409/289; 409/334
[58] Field of Search ................. 90/24 R, 24.3, 29, 44, 90/49

[56] References Cited

U.S. PATENT DOCUMENTS

| 1,432,011 | 10/1922 | Armstrong | 90/24 R |
| 3,765,305 | 10/1973 | Bishop | 90/24 R |

FOREIGN PATENT DOCUMENTS

544355 7/1957 Canada .................................. 90/24 R

Primary Examiner—Gil Weidenfeld
Attorney, Agent, or Firm—Hill, Gross, Simpson, Van Santen, Steadman, Chiara & Simpson

[57] ABSTRACT

A machine for machining arcuate bottomed blind ended slots longitudinally within the bore of a sleeve member which has a cutting tool mounted for angular reciprocation so as to execute a succession of alternate cutting and retraction strokes in relation to a sleeve member gripped in a work carrier of the machine, the machine being provided with means including a pair of cams each having a cam follower that are arranged to impart to either the cutting tool or the sleeve member a motion such that during each retraction stroke of the cutting tool one cam produces relative movement of the tool and the sleeve away from and towards each other while the second cam produces a progressive relative movement of the tool and the sleeve towards each other during each successive stroke whereby an arcuate bottomed blind ended slot is progressively machined in the sleeve.

4 Claims, 3 Drawing Figures

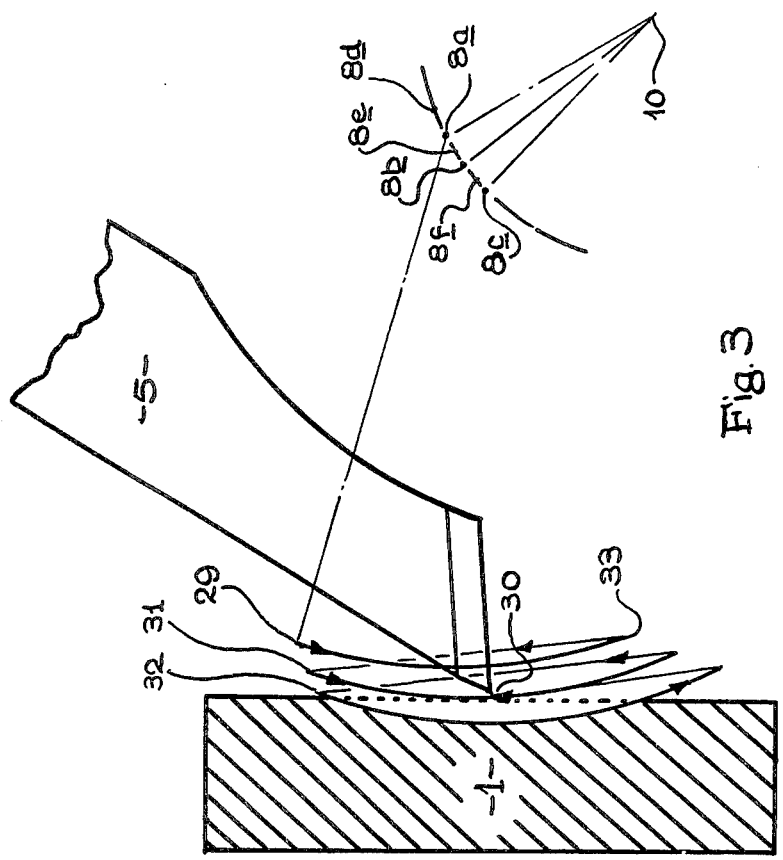

BORE SLOTTING MACHINE

This is a continuation of application Ser. No. 752,801, filed Dec. 20, 1976, now abandoned.

In my U.S. Pat. No. 3,765,305, I describe apparatus for machining valve sleeves having arranged inside the bore a series of parallel longitudinally extending circumferentially spaced ports in the form of slots. These slots are closed ended and on this account have arcuate-shaped bottoms to facilitate the entry and retraction of the tool into the bore material; six slots are commonly used.

The alternative, and still widely used method of manufacture of these sleeves is to broach the slots as for an internal spline, and to fit pressed-in stop rings in counterbores formed for this purpose each end, so defining a series of blind-end slots.

In the specification of the patent referred to above it is claimed that cost savings could be effected by manufacturing such sleeves in this one-piece manner. While this is broadly true, the savings are limited by the fact that the special slotting machine described in the specification is expensive to build and maintain, and the operating cycle time is over one minute. Thus, in large scale production, many machines are required, and hence investment is great. In order to promote the wider use of the one-piece construction, it was therefore considered necessary that the productivity of the machine be increases by a factor of 3 or 4 for the same order of investment cost.

Now it is characteristic of this method of manufacture that during the making of each slot the tool must execute a series of cutting strokes, each of successively greater depth, retracting during each return stroke to clear the bore material.

Note that when referring to the motions of the tool and the work, it is the relative motion which is of consequence. Whereas, in the prior invention, the work has caused to move to impart certain relative movements with respect to the tool, in a preferred embodiment of the present invention the work remains fixed and the tool has imparted to it all necessary movements. This distinction is however of no particular consequence in either the previous or the present invention. The mechanism may for example be readily designed to impart the necessary motions to the work while merely oscillating the tool.

Reference to the earlier specification will show that the machine provided that during these return strokes, the tool moved in an identical straight-line path, just clear of the bore, enabling the largest possible tool to be used without fouling the opposite side of the bore to where the slot is being machined. Arcuate reciprocation of the tool was provided by a crank and connecting rod drive from a main spindle. A three-dimensional cam was used to determine a specific tool path of different shape for each cutting stroke. Although this method is ideal for optimising tool strength, the use of a three-dimensional cam adds cost to the machine and limits its speed.

The present invention consists in means for machining arcuate bottomed blind ended slots longitudinally within the bore of a sleeve member comprising a rotatable work carrier, for gripping a sleeve member a cutting tool mounted on a spindle offset from and at right angles to the axis of a sleeve member gripped in said work carrier, said spindle being journalled for angular reciprocation to permit said cutting tool to execute a succession of alternate cutting and retraction strokes in relation to a sleeve member gripped in said work carrier said spindle and said work carrier being arranged for relative movement towards and away from each other, a drive shaft, means for angularly reciprocating said spindle upon rotation of said drive shaft, first cam means rotatable synchronously with said drive shaft, first cam follower means and first connecting means associated therewith and arranged to produce a relative movement of said spindle and said work carrier away from and towards each other during each retraction stroke, second cam means, means to drive said second cam means at a reduced speed from said drive shaft, second cam follower means and second connecting means associated therewith and arranged to produce a progressive relative movement of said spindle and said work carrier towards each other during each successive stroke whereby an arcuate bottomed blind ended slot is progressively machined in a sleeve in said work carrier.

It is to be noted that the term "arcuate" is not to be taken to refer only to an arc of a circle but includes other curves and combinations of curves.

When comparing the preferred embodiment of the present invention described below with the previous invention the crank drive for the reciprocation of the tool is retained, but the function of the three-dimensional am of the prior constructions is undertaken by two cams whose outputs are integrated by a "flying" bell crank lever in a manner later to be described. This "flying" bell crank has too roller followers, one at one extemity, and the other at the middle of the bend, while the third extremity is pivotally connected to a tool spindle carrier in order to impart the desired motion to the tool.

The followers are preferably urged into contact with their respective cams by a single spring acting on the spindle carrier, and so arranged as to eliminate slack at any point.

The cams and linkage are arranged in a manner which will sustain speeds two and a half times greater than was possible with the three-dimensional cam, while at the same time a somewhat greater depth of cut may be used due to the increased rigidity. Taking both factors into account, the machine cycle time is reduced to less than one-quarter of that of the prior invention.

Preferably the "flying" bell crank can, on completion of the machining cycle and with the machine at rest, be caused to move from its normal operating region to another region in a manner which moves the entire tool and tool spindle out of the way to facilitate quick loading and unloading of the workpiece.

In order that the nature of the invention may be better understood and put into practice a preferred form thereof is hereinafter described, by way of example with reference to the accompanying diagrammatic drawings in which:

FIG. 3 is a diagram illustating the movement of the tool and related movement of the axis of the tool spindle.

Figure 1:
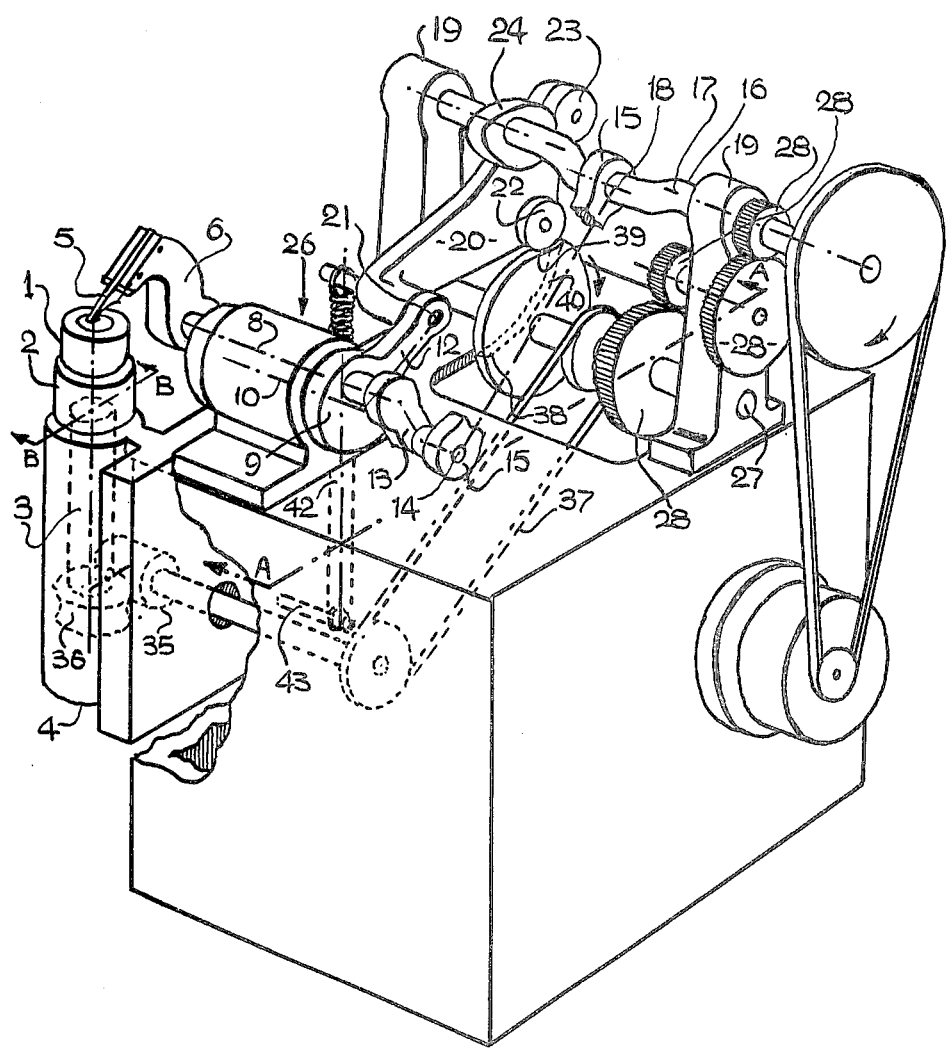
FIG. 1 is a general perspective view of a machine incorporating the invention with its parts set out in such a manner as to facilitate description.

The machine illustrated operates in the following manner:

Sleeve 1 in which the slots are to be machined is held in a collet or chuck 2 mounted on workhead spindle 3 which is journalled in workhead 4 as later described. Tool 5 is secured in tool-holder 6 which is an integral part of tool spindle 7, and angularly oscillates about an axis 8 in spindle carrier 9. The latter, in turn, is journalled in headstock 11 and angularly oscillates about an axis 10. Note that axis 8 is spaced from the journal axis 10 of spindle carrier 9 but parallel thereto. Angular oscillation of spindle carrier 9 is imparted by lever 12 in a manner described below.

Angular oscillation of spindle 7 is imparted by crank 13 secured thereto, crank pin 14, and connecting rod 15. Note that the motion imparted to the spindle carrier will shift the tool spindle axis 8 back and forth, and hence will also have an effect on its oscillation. Typically, th spindle 7 oxcillates through an angle of about 30–40° whereas the spindle carrier 9 oscillates through an angle of about 10°.

Connecting rod 15 is driven by main shaft 16 which rotates about axis 17 in journals 19 provided on the machine frame. The "throw" of crank 16, given by the displacement between axis 17 and 18, and hence forth referred to as 17-18, is such as to impart the desired angle of oscillation to tool spindle 7.

Oscillation of spindle carrier 9 and its lever 12 is given by a "flying" bell crank 20 which is journalled to lever 12 by a pin 21 incorporating slack-free anti-friction bearings.

Bell crank 20 carries roller followers 22 and 23 which engage cams 25 and 24 respectively, and are urged into contact therewith by reactions resulting from the application of a force applied in direction 26 by spring 42. Spring 42 is arranged to act on the extended end of pin 21 and its lower end is anchored to some convenient point 43 in the frame of the machine.

Thus bell crank 20 moves in space under the action of the two cams 24 and 25, whose output is effectively "added" and imparts to the spindle carrier lever 12 the required angular oscillation.

Cam 24 is mounted on spindle 16 and has a constant radius about axis 18 for about half its periphery and has a semi-elliptical section providing a reduced radius over the other half of its periphery. Cam 25 is mounted on shaft 27 driven by reduction gearing 28 from main shaft 16, and is formd as a scroll over three quarters of its periphery, with a uniform radius over the remaining quarter. As shown in FIG. 1, cam 25 has just caused follower 22 to rise to the top of its travel and descend therefrom to rest at the commencement of the minimum, constant radius section as at point 39.

The purpose of the above described mechanism is to impart the necessary motions to the tool as illustrated in FIG. 3. Here, tool 5 is shown mid-way in the third return stroke of machining a slot. In the sequence of movements illustrted here, cutting point 30 of tool 5 originally started at point 29, and described an arcuate path about the instantaneous position of the tool spindle axis indicated as 8a, ending up at point 33. When retracting, the tool point 30 is caused to travel more or less in a straight line to the commensing point 31 for the second stroke, so that the total path during a complete stroke is a distorted and reversed letter D; the second arcuate stroke from point 31 follows and it will be noted that both strokes, down and then up, are shown to have been made with the tool point clear of the bore. On the third stroke, commencing at point 32, however, material is removed from the bore, as indicated. Successive strokes now take place until the slot is formed to the final depth required. (For the sake of clarity the separation of successive paths of tool point 30 has been greatly exaggerated in this view).

The reason for the straight line path of the tool will become apparent when one considers that after the last cut when the slot is completed to depth (not illustrated in this Figure) and the tool is most deeply engaged in the bore material, the return stroke of the tool must occur clear of the previously machined slot, otherwise the tool, which has parallel sides, would tend to wedge while travelling up in the neat fitting slot. This would particularly be the case if any residual swarf were present.

The successive straight-line retract strokes are accomplished by imparting a smaller angular oscillation to the tool spindle carrier 9 such as for example to displace the spindle carrier axis from 8c, where it was at the bottom of the third stroke to 8f at the instant illustrated in FIG. 3; similar mid-return stroke positions of axis 8 for the first and second strokes are shown at 8d and 8e.

It will be recalled that cam 24 has one half of its periphery of constant radius, and during the engagement of follower 23 with this half revolution, bell crank 20 will, in so far as this cam is concerned, be stationary, and hence spindle carrer 9 will be stationary. It is during this half revolution that crank 17-18 drives the tool 30 through a cutting stroke.

During the next half rotation of cam 24, however, when the crank 17-18 is causing the tool to retract, cam 24 causes the bell crank 20 to "rock" anti-clockwise through a small angle substantially about the center located at the centre or the axis of follower 22, and so to oscillate lever 12 of the spindle carrier 9 in the opposite, clock-wise direction. This causes axis 8 of the spindle 7 to be carried away from the bore of the sleeve as for example during the first stroke from 8a to 8d.

Now it will be recalled that bell crank 20 is also positioned by the contact between follower 22 and cam 25, which latter is shaped on its periphery as a scoll. Cam 25 rotates continuously under the control of gearing 28, and hence in addition to the movement imparted to bell crank 20 during each revolution of shaft 16 by cam 24, there will be a progressive movement in the direction of raising bell crank 20 and hence rotating lever 12 anti-clockwise. Thus successive positions of tool spindle axis 8 will be at 8a, 8b, 8c for the cutting strokes and 8d, 8e and 8f for the mid point of a return stroke during the first, second and third strokes.

Provision must be made to either move workhead 2 longitudinally on the base or move the tool 5 and the holder 6 well out of the way when changing workpieces. This latter arrangement is to be preferred in that the need for a slideway between the workhead and the machine base is thereby avoided.

Figure 2:
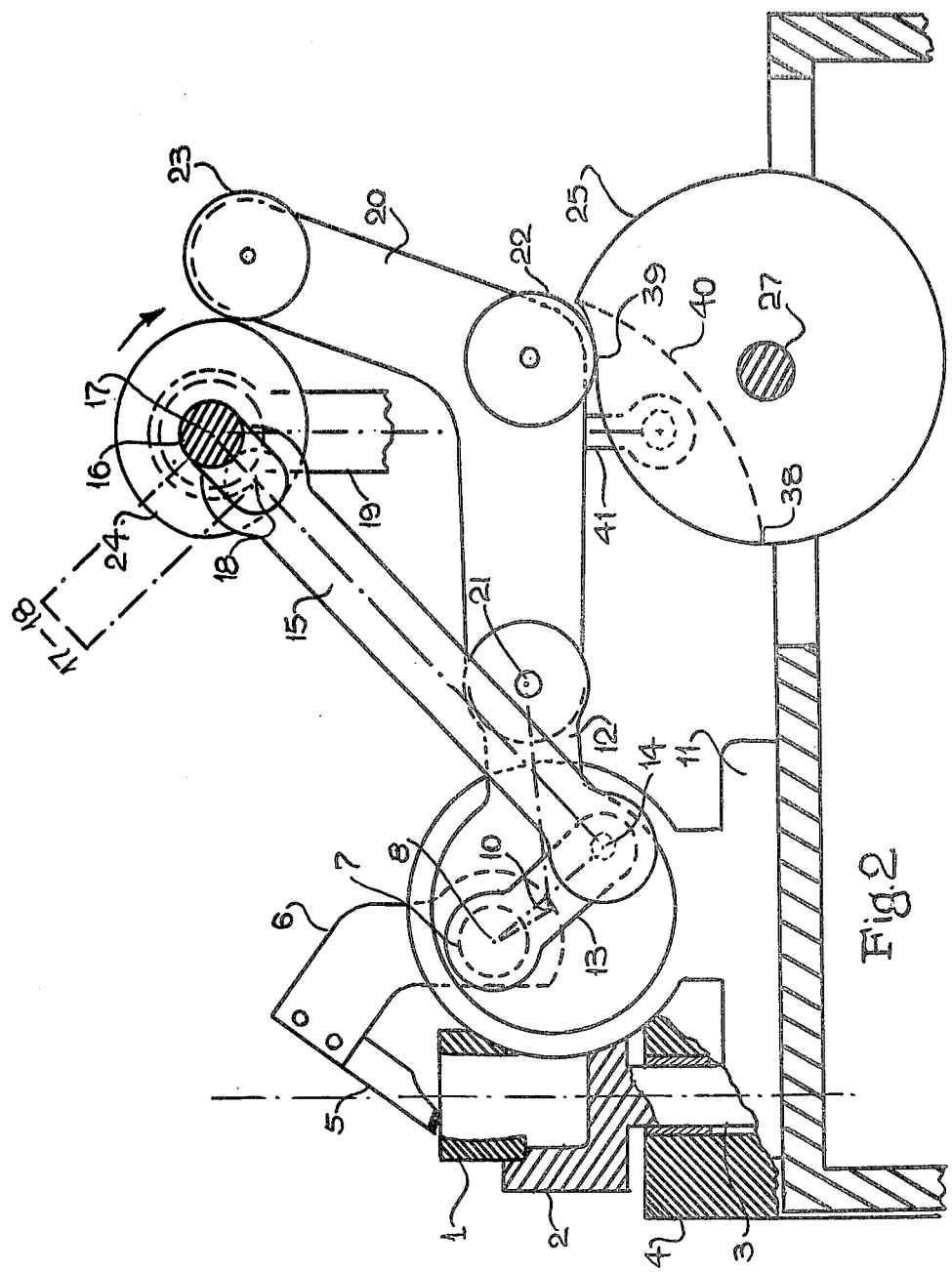
FIG. 2 is a sectional view on lines AA and BB of FIG. 1.

One means of accomplishing the required clearance movement of tool 5 and holder 6 is illustrated in FIG. 2. Here the constant radius section of cam 25 which extends between 39 and 38 has been removed as shown by the broken line 40 and provision is made as suggested by the movable stop 41 for the support of bell crank lever 20 in this position in the manner previously provided by the circular section of cam 25 extending between points 39 and 38. Thus it will be seen that the action of the mechanism in so far as the machining of successive slots is concerned is the same as the earlier described arrangement.

The workhead spindle 3 is rotated through a predetermined angle after the machining of each slot in the sleeve is completed by means of the intermittent drive mechanism indicated at 36 which is driven by the chain drive. The intermittent drive mechanism is of a conventional nature and will not be described in detail. After rotation of the sleeve is completed the next slot is machined Now when the machine has reached the completion of the final slot, and has come to rest in the position illustrated, provision may be made to move stop 41 out of the way by, for example, rotating it or sliding it sideways and so allowing bell crank lever 20 to descend in the scallop of cam 25 now provided as indicated at 40 and so impart to pin 21 and hence to lever 12 a considerable angular travel about its axis 10. Thus axis 8 is rotated through a considerable angle about spindle carrier axis 10 while 10-14 remains substantially where it is being restrained from movement by the connecting rod 15.

These actions combine to move tool 5 and tool holder 6 well clear of the work so that the completed sleeve 1 may be removed and a new piece inserted.

Other improvements or variations in the design will be obvious to those skilled in the art of special machine building, such as provisions for automatic loading of the machine to enable high speed production to be carried out efficiently. Certain provisions for balancing the machine are not illustrated in the drawings but these are commonly employed in high speed gear cutting machinery and hence are known to those knowledgeable in this art.

I claim:

1. In a machine for machining arcuate bottomed blind ended slots longitudinally within the bore of a sleeve member comprising a rotatable work carrier for gripping a sleeve member, a cutting tool mounted on a spindle offset from and at right angles to the axis of a sleeve member gripped in said work carrier, means supporting said spindle for angular reciprocations to permit said cutting tool to execute a succession of alternate cutting and retraction strokes in relation to the sleeve member gripped in said work carrier, a drive shaft, means for angularly reciprocating said spindle upon rotation of said drive shaft, first cam means rotatable synchronously with said drive shaft, first cam follower means and first connecting means associated therewith and arranged to produce a relative movement of said spindle and said work carrier away from and towards each other during each retraction stroke, second cam means, means to drive said second cam means at a reduced speed from said drive shaft, second cam follower means and second connecting means associated therewith and arranged to produce a progressive relative movement of said cutting tool mounted on said spindle and said work carrier towards each other during each successive stroke whereby an arcuate bottomed blind ended slot is progressively machined in a sleeve in said work carrier.

2. In a machine as claimed in claim 1 wherein said work carrier is fixed and said relative movements are produced by movement of said spindle.

3. In a machine as claimed in claim 1 wherein said first and second connecting means are the arms of a bell crank lever and said first and second cam followers are mounted on said bell crank lever.

4. In a machine as claimed in claim 3 wherein crank and connecting rod means are provided for angularly reciprocating said spindle upon rotation of said drive shaft, said spindle being mounted in a rotatable spindle carrier member having an axis parallel to the axis of the spindle, one arm of said bell crank lever being pivotally connected to said carrier member remote from th axis thereof, said first cam follower means being mounted at the end of the other arm of the bell crank lever and said second can follower means being mounted near the centre of the bell crank lever, resilient means urging said bell crank so that said first cam follower means engages said first cam means and said second cam follower engages said second cam means whereby said tool is caused to follow a sequence of different cutting paths in the machining of said slot.

* * * * *